United States Patent
Brunner

(10) Patent No.: US 9,999,204 B2
(45) Date of Patent: Jun. 19, 2018

(54) DEVICE FOR COMBATING THE VARROA MITE IN A BEE BROOD

(71) Applicant: Willi Brunner, Wiesendangen (CH)

(72) Inventor: Willi Brunner, Wiesendangen (CH)

(73) Assignee: Vatorex AG, Wiesendangen (CH)

(*) Notice: Subject to any disclaimer, the term of this patent is extended or adjusted under 35 U.S.C. 154(b) by 258 days.

(21) Appl. No.: 14/987,933

(22) Filed: Jan. 5, 2016

(65) Prior Publication Data

US 2016/0198687 A1 Jul. 14, 2016

(30) Foreign Application Priority Data

Jan. 9, 2015 (EP) .................................... 15150609

(51) Int. Cl.
*A01K 51/00* (2006.01)

(52) U.S. Cl.
CPC .................................... *A01K 51/00* (2013.01)

(58) Field of Classification Search
CPC ........ A01K 51/00; A01K 47/02; A01K 47/06; A01K 47/00; H05B 7/02
See application file for complete search history.

(56) References Cited

U.S. PATENT DOCUMENTS

| | | | | |
|---|---|---|---|---|
| 2,239,708 A * | 4/1941 | France | ................... | A01K 47/04 449/12 |
| 5,166,825 A * | 11/1992 | Fujie | ..................... | B06B 1/0644 310/365 |
| 5,552,998 A * | 9/1996 | Datta | .................. | G05D 23/2401 219/398 |
| 6,475,061 B1 * | 11/2002 | Huang | ................... | A01K 47/04 449/1 |
| 8,272,921 B2 | 9/2012 | Sinanis et al. | | |

(Continued)

FOREIGN PATENT DOCUMENTS

| | | |
|---|---|---|
| DE | 19834345 | 3/2000 |
| EP | 2250880 | 11/2010 |

(Continued)

OTHER PUBLICATIONS

Beehive Heater, http://cr4.globalspec.com/thread/68167/Beehive-Heater, comment by jhhassociates re PTC heater dated Apr. 26, 2011, accessed Dec. 1, 2017.*

(Continued)

*Primary Examiner* — Kathleen I Alker
(74) *Attorney, Agent, or Firm* — Berenato & White, LLC

(57) ABSTRACT

The invention relates to a device for combating the varroa mite in a bee brood, comprising at least one middle wall that can be inserted in particular into a beehive and that is provided with brood cells for female bees, the device having an electrical heating device that has a resistance heating element embedded in the middle wall and a control device connected to the latter which is designed such that an automatically running heating process can be initiated with a temporally pre-determined heat-up phase that lasts until a temperature of 39° C. to 45° C., preferably 39° C. to 42° C., is reached at the bottom of the brood cells in the region of the resistance heating element and then with a subsequent phase of maintaining this temperature for a predetermined period of time.

15 Claims, 2 Drawing Sheets

(56) References Cited

U.S. PATENT DOCUMENTS

| | | | |
|---|---|---|---|
| 8,383,992 B2* | 2/2013 | Wang | H05B 1/0252 210/721 |
| 9,326,507 B2* | 5/2016 | Ziegelmann | A01N 37/06 |
| 2008/0064298 A1* | 3/2008 | Junqueira de Souza | A01K 47/06 449/2 |
| 2010/0066481 A1* | 3/2010 | Chang | H01C 1/08 338/22 R |
| 2011/0185787 A1* | 8/2011 | Briens | A01K 1/031 73/23.34 |
| 2012/0202403 A1 | 8/2012 | Sinanis et al. | |
| 2015/0084784 A1* | 3/2015 | Suta | H04Q 9/02 340/870.01 |
| 2017/0000092 A1* | 1/2017 | Domocsok | A01K 47/00 |
| 2017/0064931 A1* | 3/2017 | Tagliaferri | A01K 47/04 |

FOREIGN PATENT DOCUMENTS

| | | |
|---|---|---|
| WO | WO9214355 | 9/1992 |
| WO | WO0243475 | 6/2002 |
| WO | WO2012114136 | 8/2012 |

OTHER PUBLICATIONS

European Search Report dated Jun. 11, 2015 from priority application EP 15150609.

* cited by examiner

DEVICE FOR COMBATING THE VARROA
MITE IN A BEE BROOD

CROSS-REFERENCE TO RELATED APPLICATIONS AND CLAIM TO PRIORITY

This application is related to application number 15 150 609.4, filed Jan. 9, 2015 with the European Patent Office, the complete disclosure of which is incorporated herein by reference and to which priority is claimed.

FIELD OF THE INVENTION

The invention relates to a device for combating the varroa mite in a bee brood, comprising at least one foundation that can be inserted in particular into a beehive and that is provided with brood cells for female bees.

BACKGROUND OF THE INVENTION

Bee colonies are generally kept by beekeepers in beehives, also called brood boxes, and are used here to produce honey. The beehives are normally cuboid. Rectangular middle walls, suspended next to one another, are inserted into the beehives and are surrounded by frames by means of which they can be inserted removeably into the beehives. Within the context of the present description and claims the term "middle wall" is to be understood here as meaning a wall with any outline that is provided on one or on both sides with pre-shaped brood cells independently of whether the middle wall is surrounded by a frame or not.

In most cases the middle walls are in the form of rolled or cast sheets made of bees wax, in which the brood cells are impressed in the form of hexagons with equal sides and which respectively form the honeycombs. After suspending the middle walls in the bee colony, the bees grip onto the honeycomb pattern and extend the pre-formed brood cells with the aid of the bees wax produced by them so as to form a brood comb.

As regards the middle walls, a distinction is made between middle walls with brood cells for female bees—the so-called worker inner cells, and brood cells for male bees—the so-called drone cells. The latter have a considerably greater diameter and depth than the worker inner cells.

For a number of years beekeepers have been confronted with a drastic increase in the mortality rate of bee colonies, in particular winter bee colonies. Mites that are harmful to bees, especially the varroa mite, are held responsible for the high mortality rate. In order to combat the varroa mite, basically two methods have been used, namely on the one hand chemical treatment, for example by means of organic acids, and on the other hand thermal treatment. The disadvantage of the chemical treatment is that there is the risk that residues from the treatment product will pass into the honey. This risk does not exist with the purely thermal treatment.

For the thermal treatment special heating cabinets have been developed in which the brood combs are subjected to a flow of warm air for a number of hours. For this purpose the brood combs infested with varroa mites are removed from the beehive, and the bees sitting on the latter are shaken or wiped off. The bee-free brood combs are then suspended in the heating cabinet. Then the temperature of the flow of warm air is slowly increased until a temperature of between 39 and 42° C. is reached in the brood cells. This temperature is then maintained for a number of hours (WO 92/14355 A1 and EP 2 250 880 B1).

The treatment by means of a separate heating cabinet is very time-consuming due the necessity of bringing the brood combs into the heating cabinet and back into the beehive. Moreover, the purchase of the heating cabinet represents a considerable, hardly cost-effective investment for amateur beekeepers. Therefore, due to the simpler handling and the lower costs, many beekeepers therefore still resort to the chemical approach.

As an alternative to the warm air treatment in separate heating cabinets it has been proposed to combat the varroa mite by providing a middle wall or a number of middle walls with brood cells for the drones with a heating device that has a resistance heating element embedded in the middle wall and a control device connected to the latter (see U.S. Pat. No. 8,272,921 B1). The middle wall equipped in this way or the middle walls equipped in this way are inserted into the brood box and is/are extended by the bees to form a drone brood comb or drone bee combs. During the development of the drone larvae into adult drones the heating device can be switched on in order to heat the drone brood comb or the drone brood combs. In a few minutes this causes the drone brood comb(s) to heat up to approximately 65° C. After a similarly small number of minutes the heating device is switched off again. This strong heating causes both the varroa mites and the drone brood to die.

It is an advantage of this system that no special heating cabinet with handling necessary for its use is required. It is a disadvantage, however, that the effectiveness is unsatisfactory because the combating of the varroa mites is restricted to the drone brood comb designed for drones, and accordingly the brood cells for the workers, which are substantially more important for the bee colony population, remain untreated, and so unprotected. In addition, that brood combs for the drone brood are only liable to a varroa mite infestation during the relatively short breeding season for drones, and so it is only possible to combat the varroa mite during this time.

SUMMARY OF THE INVENTION

The object underlying the invention is to provide a device for combating the varroa mite in a bee brood that is easy to handle and enables substantially better protection of the bee colony from mites that are harmful to bees over the entire yield period.

According to the invention this object is achieved with an apparatus of the type specified at the start in that an electrical heating device is provided that has a resistance heating element embedded in the middle wall with brood cells for female bees, and a control device connected to the latter, the control device being designed such that an automatically running heating process can be initiated with a temporally predetermined heat-up phase that lasts until a temperature of 39° C. to 45° C., preferably 39° C. to 42° C., is reached in the bottoms of the brood cells in the region of the resistance heating element, and then with a subsequent phase of maintaining this temperature for a pre-determined period of time. Therefore, the basic idea behind the invention is to provide a device with at least one middle wall with brood cells for female bees which, after having been inserted into the beehive, can be electrically heated in such a way that only the varroa mites are killed here, whereas the bees and bee larvae in this area remain unharmed. Therefore, unlike with the device according to U.S. Pat. No. 8,272,921 B2, the heating also only takes place to a temperature which is exclusively harmful to the varroa mites. It has been shown that in this way it is possible to combat the varroa mite in an extremely effective way because the heating process takes place where the varroa mite is particularly harmful. In order to initiate the heating process it is not necessary to remove the brood comb from the beehive, i.e. the heating process is preferably initiated in the beehive itself, and so it is not necessary to handle the brood coomb or the brood combs.

When applying the basic idea behind the invention it is not ruled out to additionally provide at least one, preferably all of the middle walls with brood cells for drones, with the heating device according to the invention and to also subject these middle walls to the heating process according to the invention after insertion into the beehive and during the breeding period in order to combat the varroa mite in this area too. However, in order to protect the workers this additional measure is not necessary, especially as the varroa mite infestation in the area of the brood cells hardly causes any damage to the drones.

The resistance heating element can be of any shape and extension. Advantageously it should not extend over the entire surface of the middle wall, but rather be restricted to a central area. It should cover at least 80% of the brood surface. The upper feeding zone, the side cells for pollen stocks and any empty remaining cells on the lower side can be kept free from the resistance heating element.

Under no circumstances should the heat-up take place as quickly as with the apparatus according to U.S. Pat. No. 8,272,921 B1. So that the brood cells heat up evenly and the bee brood is protected from rapid increases in temperature the heat-up phase should last for at least 30 minutes, in particular at least 1 hour. The heating up should take place evenly at a specific rate, for example a maximum of 0.1° C./min. The maintenance phase should also be considerably longer than with the apparatus according to U.S. Pat. No. 8,272,921 B2, i.e. at least 30 minutes, in particular at least 1 hour, preferably at least 1.5 hours, in particular 2 hours. It can also be considerably longer. Ultimately, the length of the maintenance phase is determined with the aim of on the one hand killing the varroa mites that are in the brood cells of the brood combs, but on the other hand of not consuming power needlessly.

The control device can be designed such that the lengths of time for the maintaining and heat-up phase are set in the control device. However, the control device can also be designed so that the user of the device according to the invention can adjust the lengths of time and so adapt to the respective situation in which the beehive is set up.

According to another feature of the invention provision is made such that the control device is designed such that after the initiation of a first heating process at least one additional heating process is automatically brought about. The intervals between two consecutive heating processes can be adapted to the intensity of the varroa mite infestation. During the breeding period from March to September heating processes can be initiated at weekly intervals, for example every three weeks, the control device carrying this out automatically. Other, for example longer intervals, can also be provided. It is possible here to set the intervals in the control device so that they are fixed. Advantageously however, the control device has a setting means for the beekeeper so that the beekeeper can determine the length of time of the intervals himself, preferably within reasonable limits as gained from experience. It is important that the beekeeper does not have to observe and actuate the device because the individual heating processes are initiated by the control device itself without the beekeeper's involvement or intervention.

A particularly advantageous feature of the invention is that the resistance heating element is in the form of a PTC resistor or thermistor. It is a characteristic of these PTC resistors that the electric resistance increases approximately linearly with the temperature. This opens up the possibility of controlling the temperature in the heat-up phase and in the maintenance phase by adapting the respectively measured values for current and voltage in the PTC resistor to values stored in the control device. This type of control device is of elegant design and renders the installation of a temperature sensor in the connected middle wall unnecessary.

In a particularly preferred configuration the device has a number of middle walls with resistance heating elements embedded in the latter and which are all connected to the control device by means of which a heating process can then respectively be initiated in each of the middle walls. Preferably, as already mentioned above, these are all middle walls with brood cells for female bees. Here the middle walls can form groups each comprising a number of middle walls, each group being intended for use in a respective beehive. Therefore, the device according to the invention is also suitable for combating the varroa mite in a number of beehives of a beehouse, the heating processes being controlled centrally by a single control device in the middle walls extended to form brood combs. As also already mentioned above, the brood combs provided for the drone brood can also be included here by these respectively also being subjected to a heating process according to the invention.

In the configuration of the device according to the invention described above, the control device should be designed such that the heating processes for the individual brood combs are carried out one after the other. In this way excessive heat input within a beehive and also excessive current consumption which would occur if the heating processes run in parallel is avoided. The individual heating processes should follow on immediately from one another. However, this is not essential, i.e. for the purpose of further reducing the heat input of the beehive intervals of time can also be provided between two heating processes of adjacent middle walls or brood combs. After the conclusion of the heating processes for all of the brood combs, in this respect repetition of these heating processes can also be provided, either in predetermined intervals of time or predeterminable intervals of time that can be set. As already mentioned above, these intervals can be a number of weeks within a breeding period.

The design of the control device can be extended in a wide variety of ways in order to facilitate the beekeeper's control by means of the heating processes initiated by the control device. The date and the time of each heating process for each middle wall or brood comb can thus be stored and then be made retrievable for the beekeeper. The same applies to any malfunctions that can be indicated to the beekeeper by optical or acoustic warning elements. Such malfunctions may occur in the energy supply or if there is insufficient power supply to the resistance heating elements. This can all be recorded and be indicated in a display. Ultimately, the overall aim is to design the control device such that on the one hand the beekeeper is largely relieved of having to take any action, but on the other hand he can monitor and query the function of the device according to the invention at any time and, in addition, be informed of any malfunctions.

BRIEF DESCRIPTION OF THE DRAWINGS

In the drawings the invention is illustrated in more detail by means of an exemplary embodiment. These show as follows.

DETAILED DESCRIPTION OF THE PREFERRED EMBODIMENT(S)

Figure 1:
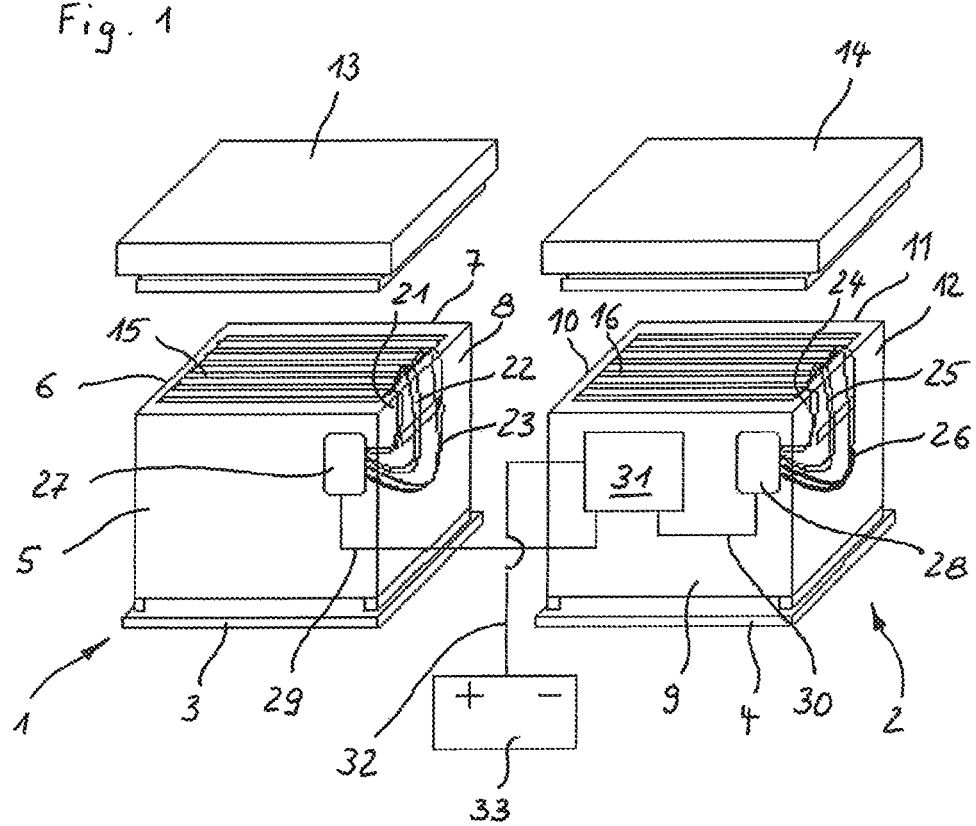
FIG. 1 two beehives with the device according to the invention for combating varroa mites in a perspective illustration.

In FIG. 1 two substantially cubical beehives 1, 2 are shown next to one another. They each have a bottom wall 3 or 4 and four side walls 5, 6, 7, 8 or 9, 10, 11, 12 arranged at right angles to one another. Each of the beehives 1, 2 has a removeable top wall 13 or 14 which are shown here in the vertically lifted off state.

Suspended in each of the beehives 1, 2 is a plurality of middle walls—identified, for example, by 15 and 16—, that extend vertically and parallel to the side walls 5, 7 and 9, 11. Some of the middle walls 15, 16 are formed as shown in FIGS. 2 and 3.

Figure 2:
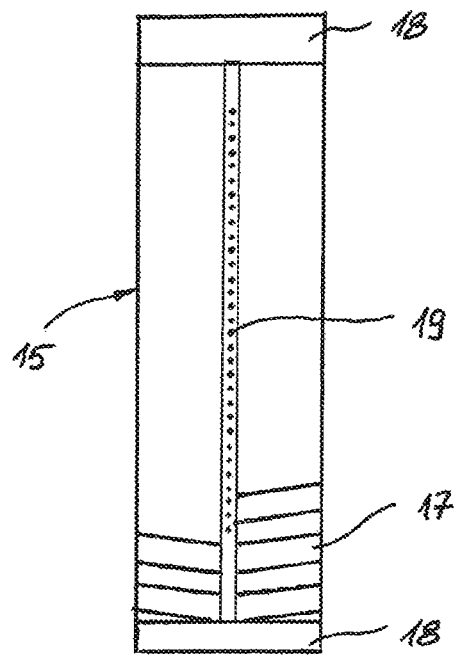
FIG. 2 a vertical section through a middle wall for the beehives according to FIG. 1, and FIG. 3 a side view of the middle wall according to FIG. 2.
Figure 3:
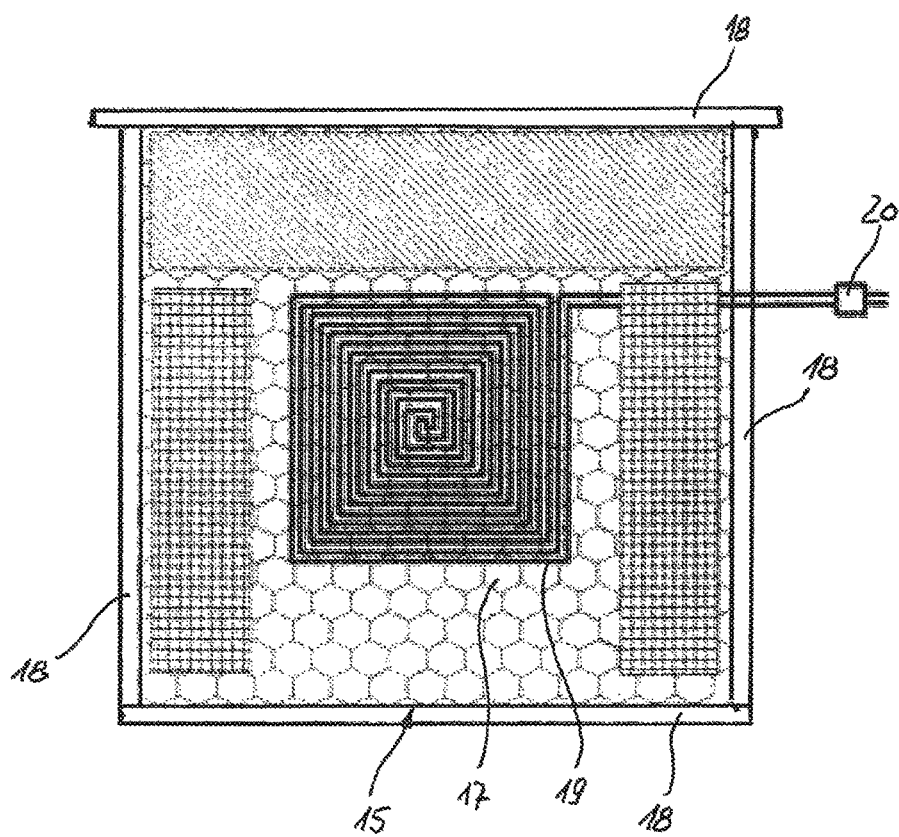

The middle wall 15 shown in FIGS. 2 and 3 is made of wax and is provided on both sides with hexagonal brood cells, also formed from wax—identified, for example, by 17—that are largely configured as brood cells 17 for female bees and only parts of which are drawn in FIG. 2. The middle wall 15—like all of the other middle walls 15, 16—is surrounded by a frame 18 by means of which the middle wall 15 can be suspended in one of the brood boxes 1, 2 so that it hangs down perpendicularly.

A resistance heating element in the form of a rectangular heating coil 19 made of PTC resistor material is embedded in the middle wall 15. Its shape and extension are shown in particular by FIG. 3. The heating coil 19 is guided out of the middle wall 15 and ends in a plug 20. The heating coil 19 only extends in the middle region of the middle wall 15. The upper hatched region, also called the feeding belt, and the side regions drawn to be chequered, which are intended for the storage of pollen, and a lower region, are left free.

In the example according to FIG. 1 three of the middle walls 15, 16 are respectively formed as shown in FIGS. 2 and 3, i.e. these middle walls 15, 16 are provided identically with heating coils 19. The respective middle walls 15, 16 are each connected to a colony control system 27 or 28 assigned to the beehive 1 or 2 by wires 21, 22, 23 or 24, 25, 26. The colony control systems 27, 28 are coupled to a beehouse control system 31 by wires 29, 30. By means of another wire 32, this beehouse control system is connected to a power source 33 that supplies, for example, mains current or is in the form of a battery or solar cell.

The beehouse control system 31 has an integrated circuit that is controlled by software. First and foremost the beehouse control system 31 makes it possible to control or regulate a heating process for a connected middle wall 15, 16. By means of the wires 29, 30 the colony control systems 27, 28 then receive a power supply specific to the heating process. The colony control systems 27, 28 primarily each serve to switch on one of the connected middle walls 15, 16, i.e. the colony control systems 27, 28 ensure that only one of the connected middle walls 15, 16 is respectively supplied with electric current coming from the basic control system 31. In detail, this takes place as follows.

The heating processes are carried out after suspending the middle walls 15, 16 in the beehives 1, 2, when the middle walls 15, 16 have been extended to form brood combs and have been allocated a bee brood. In the following description the brood combs are nevertheless still called middle walls 15, 16.

The heating processes for the connected middle walls 15, 16 that have been extended to form brood combs are initiated by the beekeeper by inputting the date and the time into the beehouse control system 31 by means of corresponding function keys. A test run takes place in relation to all of the connections and the display of the number of beehives 1, 2 and of connected middle walls 15, 16. If the system signals a fault, the test is carried out again after eliminating the indicated fault. If the fault indication is ignored, the system will start automatically after a specific time, but prevents treatment in the beehive 1, 2 where an error has occurred.

If the system in the beehouse control system 31 indicates correction function, a heating process will be started automatically. First of all, in the first beehive 1 a first middle wall 15, i.e. its heating coil 19, is supplied with electric current here. Since the heating coil 19 is in the form of a PTC resistor, its resistance increases as the temperature rises. By measuring the respective current and the respective voltage at intervals of 1 minute and in each case by comparing with a stored value dependently upon the time which has respectively passed, the power supply is controlled by repetitive switching on and off. If a maximum value for current and voltage is exceeded here, the power supply is interrupted. If the maximum value is not exceeded, the current is switched off after a respectively pre-programmed time. The power supply is then switched on again after a specific time, and the current and voltage are measured again. By the repetitive comparison with specified values, the heat-up phase is controlled according to a desired progression, preferably a linear, i.e. even, progression. In the subsequent maintaining phase after the maximum temperature has been reached, the prescribed control serves to keep the temperature as constantly as possible at a value of approximately 42° C. at the bottom of the brood cells 17 in the region of the heating coil 19.

In the exemplary embodiment the heat-up phase lasts for approximately 1 hour and the maintenance phase for approximately 2 hours, and so the heating process for a middle wall 15, 16 lasts for a total of 3 hours. After the end of the maintenance phase the middle wall 15 that has just been treated is separated in co-operation with the colony control system 27 from the power supply, and preferably the adjacent middle wall 15 is turned on. The same heating process then takes place for this middle wall 15, and immediately. If all of the connected middle walls 15 in the beehive 1 are treated thermally, the beehouse control system 31 switches to the colony control system 28 of the second beehive 2, and the middle walls 16 connected here are treated thermally one after the other in the prescribed manner, one after the other and in direct succession. If there are additional beehives, corresponding successive treatment of the middle walls connected here takes place.

If the treatment of the middle walls 15, 16 in the beehives 1, 2 is completed, the pre-scribed process starts from the beginning provided that there has not been inputted into the beehouse control system 31 an interval time over which the thermal treatment of the connected middle walls 15, 16 is interrupted. Over the breeding season, this interval time can be a number of weeks. The beekeeper can adapt the repetition rate on the basis of his observations of the varroa infestation.

The beehouse control system 31 is not only equipped to control the individual heating processes for the middle walls 15, 16, but also has additional functions. Thus, the individual heating processes are documented such as to show the date, time, corresponding beehives 1, 2 and connected middle wall 15, 16. The beehouse control system 31 has a display by means of which it can be read off which individual middle wall 15, 16 is being treated thermally. Emergency functions are integrated which sound an alarm if insufficient power supply, short circuits or the like occur, and also record this. Back-up batteries ensure that the processor of the basic control system 31 safeguards the data even if there is a power outage. The reports can be read out by means of an SD card, and it is also possible to enter different procedures for the heating processes by this means. Furthermore, a stand-by mode is provided that makes it possible to work on the bee colonies during a heating phase. A switch is automatically made back to normal operation here after a specific, settable time.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above, provided they come within the scope of the following claims and their equivalents.

I claim:

1. A device for combating varroa mites in a bee brood, comprising at least one middle wall that can be inserted into a beehive and that is provided with brood cells for female bees; an electric& heating device that has a resistance heating element embedded in the at least one middle wall; and a control device connected to the resistance heating element which is designed such that an automatically running heating process can be initiated with a temporally pre-determined heat-up phase that lasts until a temperature of 39° C. to 45° C. is reached at a bottom of the brood cells in a region of the resistance heating element and then with a subsequent maintenance phase of maintaining the temperature for a predetermined period of time, wherein the resistance heating element is a Positive Temperature Coefficient (PTC) resistor and the control device is configured such that the temperature in the heat-up phase and in the maintenance phase is controlled by adapting the respectively measured values for current and voltage in the PTC resistor to values stored in the control device.

2. The device according to claim 1, wherein the heat-up phase lasts for at least 30 minutes and/or that the temperature is increased evenly in the heat-up phase.

3. The device according to claim 2, wherein the subsequent maintenance phase lasts for at least 30 minuets.

4. The device according to claim 2, wherein the control device is designed such that the automatically running heating process comprises bringing about at least one additional heating process after the initiation of a first heating process.

5. The device according to claim 2, wherein the at least one middle wall comprises a number of middle walls with resistance heating elements embedded in the middle walls and connected to the control device and by means of which the automatically running heating process can respectively be initiated in each of the middle walls.

6. The device according to claim 1, wherein the subsequent maintenance phase lasts for at least 30 minutes.

7. The device according to claim 6, wherein the control device is designed such that the automatically running heating process comprises bringing about at least one additional heating process after the initiation of a first heating process.

8. The device according to claim 6, wherein the at least one middle wall comprises a number of middle walls with resistance hating elements embedded in the middle walls and connected to the control device and by means of which the automatically running heating process can respectively be initiated in each of the middle walls.

9. The device according to claim 1, wherein the control device is designed such that the automatically running heating process comprises bringing about at least one additional heating process after the initiation of a first heating process.

10. The device according to claim 9, wherein the at least one middle wall comprises a number of middle walls with resistance heating elements embedded in the middle walls and connected to the control device and by means of which the automatically running heating process can respectively be initiated in each of the middle walls.

11. The device according to claim 1, wherein the at least one middle wall comprises a number of middle wails with resistance heating elements embedded in the middle walls and connected to the control device and by means of which the automatically running heating process can respectively be initiated in each of the middle walls.

12. The device according to claim 11, wherein the middle walls form groups, each group comprising a plurality of middle walls and being intended for use in a respective beehive.

13. The device according to claim 11, wherein the control device is designed such that the heating processes for the middle walls can be carried out one after the other.

14. The device according to claim 11, wherein the control device is designed such that the heating processes for all of the middle walls can be brought about at predetermined intervals of time or predeterminable intervals of time that can be set.

15. The device according to claim 1, wherein the control device is designed such that the date and time of the heating process for the at least one middle wall are stored.

* * * * *